July 19, 1955 P. BAKKER 2,713,616

FINDER DISTRIBUTOR PERMANENT TIMER

Filed Oct. 2, 1952 4 Sheets-Sheet 1

*INVENTOR.*
PIER BAKKER

*BY* Mc Walter Owen

ATTY.

INVENTOR.
PIER BAKKER
BY [signature]
ATTY.

July 19, 1955 P. BAKKER 2,713,616

FINDER DISTRIBUTOR PERMANENT TIMER

Filed Oct. 2, 1952 4 Sheets-Sheet 3

INVENTOR.
PIER BAKKER

BY Wm. Walter Owen

ATTY.

July 19, 1955 P. BAKKER 2,713,616

FINDER DISTRIBUTOR PERMANENT TIMER

Filed Oct. 2, 1952 4 Sheets-Sheet 4

INVENTOR.
PIER BAKKER

BY Mc Walter Owen

ATTY.

United States Patent Office 2,713,616

Patented July 19, 1955

2,713,616

FINDER DISTRIBUTOR PERMANENT TIMER

Pier Bakker, Chicago, Ill., assignor to Automatic Electric Laboratories, Inc., Chicago, Ill., a corporation of Delaware Application October 2, 1952, Serial No. 312,800

13 Claims. (Cl. 179—18)

This invention relates to improvements in telephone systems, and more particularly to improvements in finder-allotter apparatus and time-disconnect equipment associated therewith.

In small automatic community exchanges, having equipment similar to that shown in the attached drawings, in which allotter circuits provided ground for a link starting circuit, difficulty was frequently encountered with respect to the operation of "kick-off" equipment when a faulty finder was encountered—e. g. the operation of the finder stepping magnet was prevented by faulty self-interrupting magnet contacts. When a call was initiated and the faulty finder-connector link, preselected by an allotter, was unable to find the calling line within a predetermined time interval, the allotter "kicked" its wipers off the contacts of the faulty finder to the contacts of the next succeeding finder-connector link, which we will assume was idle. If the operations of the timing and kick-off relays were not accurately synchronized with the operations of the allotter start and hold relays, an unwanted pulse was transmitted over the allotter start lead. As a result, one unwanted pulse was then transmitted over the connector pulsing circuit of said next succeeding link, said pulse being interpreted by said next succeeding link as a dialed digit.

In one system, if the first digit dialed over said calling line was normally a code digit, it was interpreted by said next succeeding link as the second digit as a result of said "unwanted" one pulse being interpreted as the first digit; and the proper connections were not completed.

In another system, if the first digit dialed over said calling line normally controlled the vertical stepping said one "unwanted" pulse caused the connector wipers of said next succeeding link to step in a vertical direction; the vertical off-normal spring contacts corresponding to 139' shown in applicant's Fig. 1, then closed to complete an operating circuit to the allotter motor magnet. Upon a subsequent release of the allotter hold relay, the magnet released; and the allotter kicked its wipers off the contacts of said next succeeding finder-connector link to the contacts of a third finder-connector link, having thus by-passed an idle, fault-free link.

It sometimes occurred that a call was initiated when the only idle links were a faulty link and one fault-free link which was to be selected immediately after the selection of the faulty link. With the condition described in the preceding paragraph, each time the faulty link attempted and failed to find a calling line, said one fault-free link would be by-passed in the manner described above due to the false pulse to said one fault-free link. The allotter would continue to hunt for a link to route said call until another link became idle or until the call was abandoned.

Another difficulty occasionally encountered by such equipment manifested itself in the "permanent" timer circuits. Previous equipment, similar in character to that shown in the attached drawings and having "permanent" timer equipment common to all links, released links held by faulty subscriber lines only after all links were busy. Under certain circumstances—e. g. a faulty link in which a finder switching relay corresponding to R160 of applicant's Fig. 1 could not operate—the multiple ground controlled by the switching relay would not be completely removed from the all-trunks-busy conductor corresponding to applicant's conductor 118 and release of the links held by faulty lines could not be accomplished.

For ease of explanation herein, the term "permanent" will be used to refer to a fault condition on a subscriber line which will complete a path for current flow over the subscriber line, thereby simulating a calling condition. In response to said fault condition the line relay of the associated line circuit will be operated and maintained operated. For example, with reference to Fig. 1, this fault condition may be the result of conductor 104 being grounded, of conductors 104 and 105 being connected by a foreign conductor or touching each other or the result of a handset at a station connected to conductors 104 and 105 being knocked from or left off of its associated cradle. A similar condition exists when a subscriber dials all or part of a directory number and holds a partially completed connection for an unreasonable time interval.

It is an object of this invention to eliminate both of the above described difficulties. As shown in Fig. 4, the timer and kick-off relays, R440 and R450, are so interlocked with the start and hold relays, R430 and R420, that a false start circuit cannot be completed to the link selected after the release of a link having a fault of the type described above. Ground is removed from the start lead 116 when the kick-off relay R450 operates and is not restored until the allotter restores to normal and operates for a second time in the normal manner. In applicant's invention the necessity for exceedingly accurate adjustment of the allotter relays has been eliminated. Frequent readjustment is no longer necessary, thereby cutting maintenance costs.

The "permanent" timer equipment is so designed that it will be in operation whenever the start relay—e. g. R240—of any finder-connector link is energized. So long as the back-bridge relay of a link seized over a line on which a "permanent" has been placed is not operated, said timer equipment will release said link within a predetermined time interval after said "permanent" occurs, rather than releasing said link only after all links are busy. This new "permanent" timer equipment is adapted for use in the old systems with only a few minor modifications. Also said "permanent" timer equipment is common to all links associated therewith.

In the accompanying drawings, forming a part of this specification,

Figs. 1, 2 and 3 show the connector section of said finder-connector link.

Figure 1:
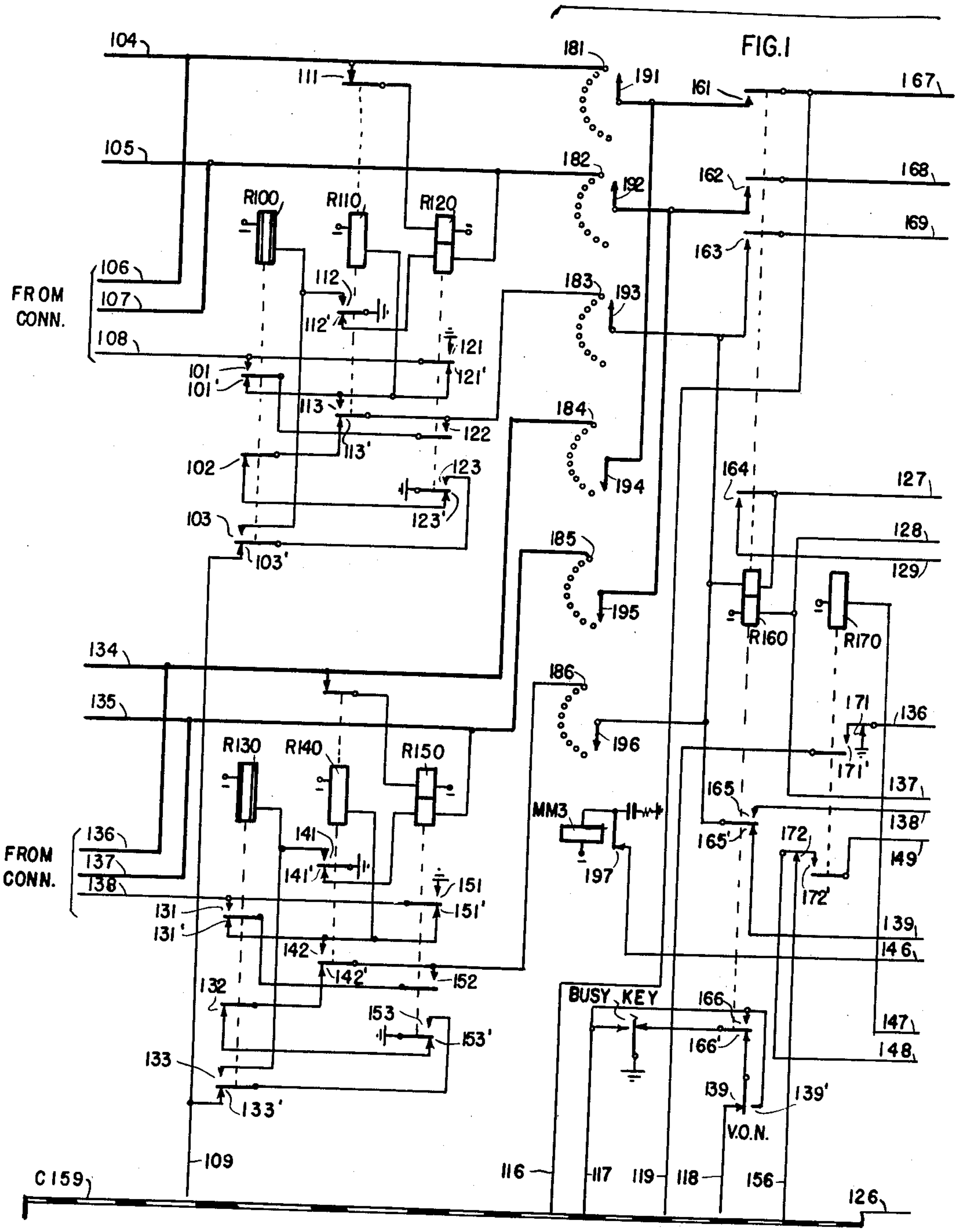
Fig. 1 shows two subscriber lines, the line circuits associated therewith, and a finder section of a finder-connector link "L."
Figure 2:
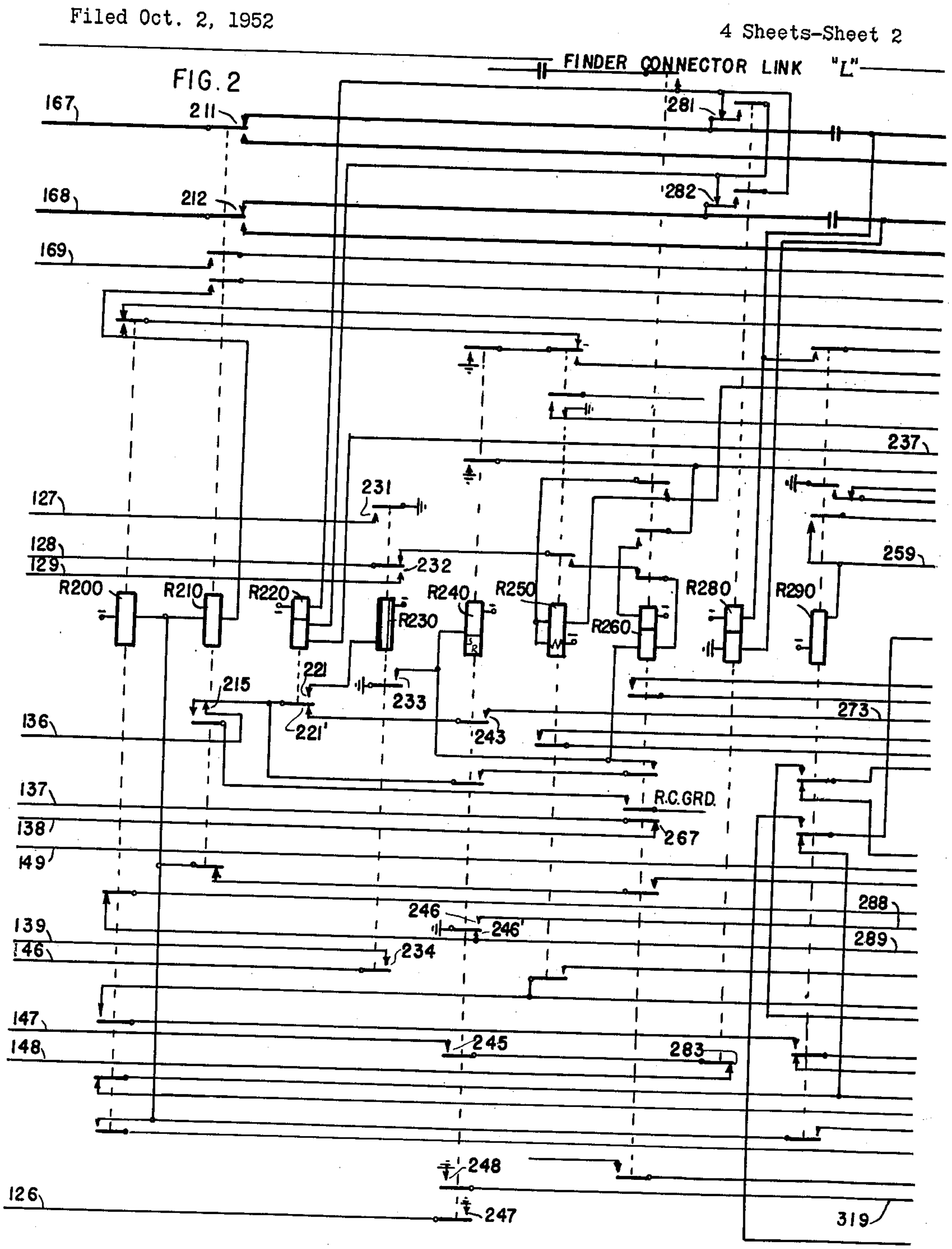
Figure 3:
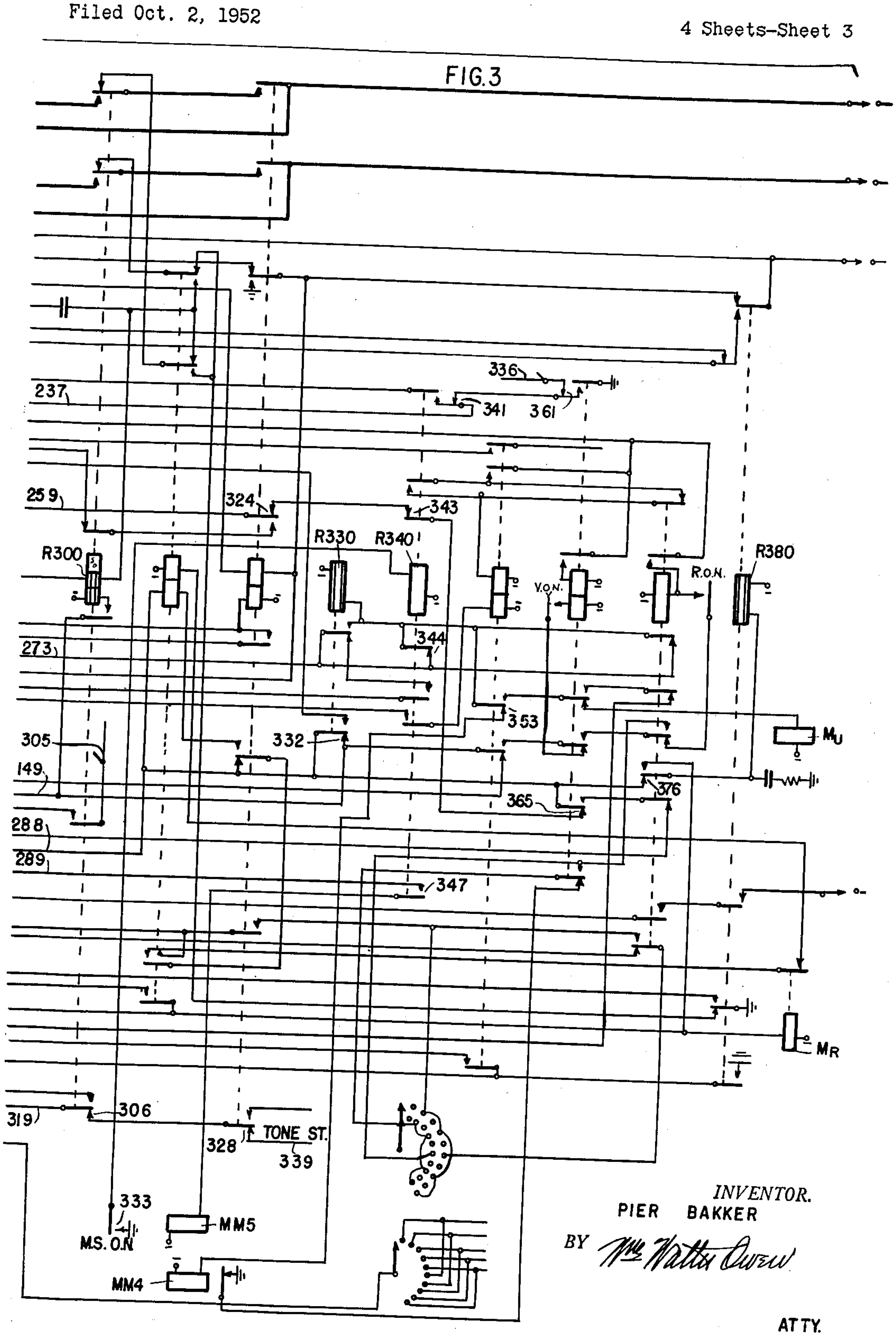

Fig. 3 also shows a minor switch associated with said link.

Figure 4:
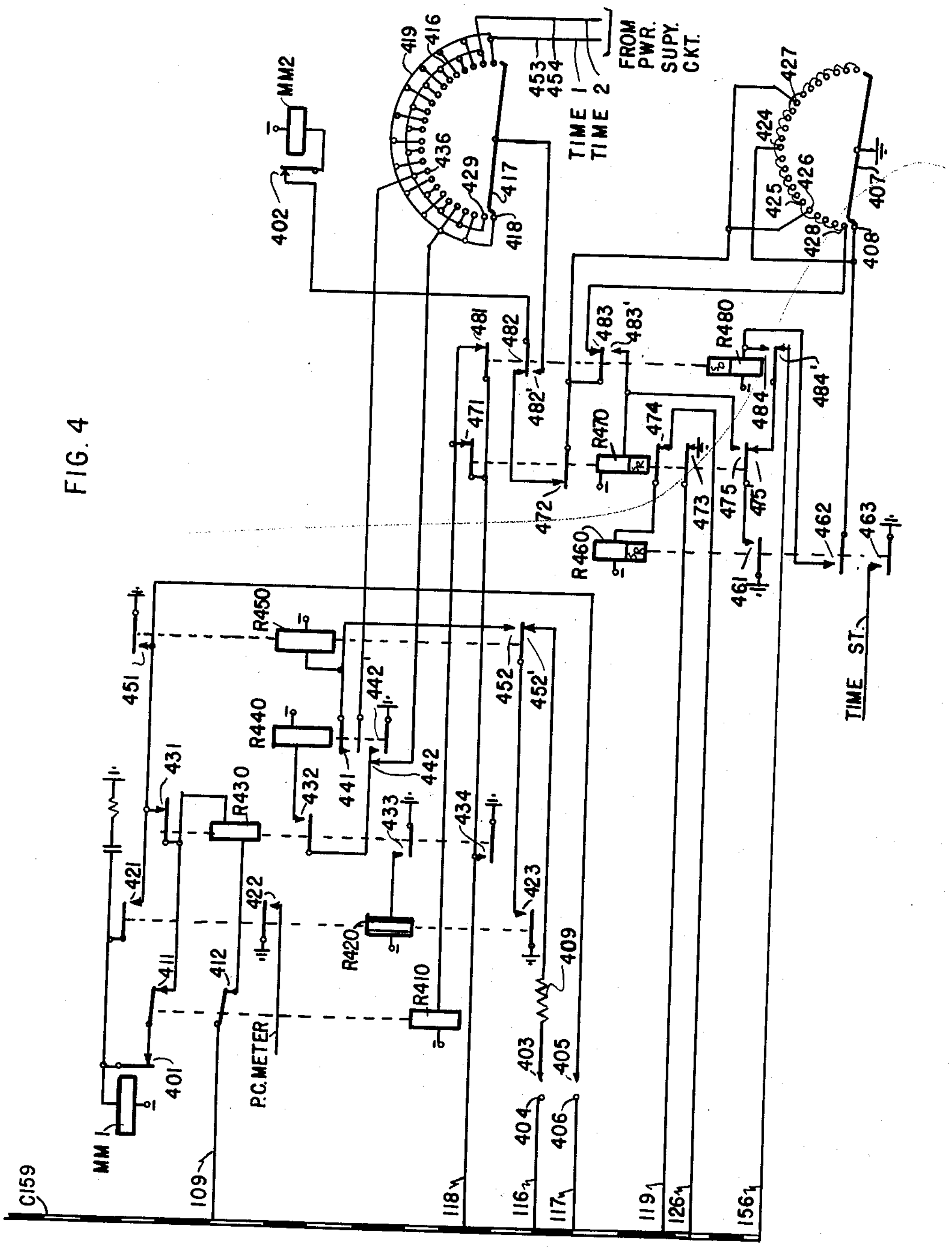

Fig. 4 shows the allotter and the common time-disconnect equipment associated therewith.

The allotter is of the type employing a rotary switch for preselecting finder-connector links. It has incorporated within it time-disconnect equipment operative to release a link when a faulty finder or a "permanent" on a subscriber line is encountered.

The line circuits are of the usual three relay type comprising line, cut-off, and lockout relays.

The finder section of each link utilizes a rotary switch, the connector section utilizing a minor switch in addition to a typical Strowger switch. If a call to a distant exchange is desired, the minor switch will respond to a single digit (7, 8, 9, 10) to initiate a trunk selecting operation; if a local number (4 digit) is called, the minor switch absorbs the first digit (1, 2, 3, 4, 5) and responds to the fourth digit for ringing selection.

Operation of the apparatus will now be more particularly described. It is to be noted that the description will be limited to such operations as are related to release of faulty-finders and to release on "permanents."

When a party initiating a call at a substation (not shown) on lines 104—105 removes the handset provided at said substation from the cradle associated therewith, a circuit is completed from the exchange battery, through the upper winding of line relay R120, contacts 111, line 104, through the calling substation back to line 105, through the lower winding of R120, contacts 112' to ground. R120 energizes and at contacts 121 places a ground upon the private conductor 108, thereby to mark the calling line busy to any connector having access thereto; at contacts 122 prepares an operating circuit for cutoff relay R110; at contacts 123' removes ground from wiper contacts 183; and at contacts 123 completes a circuit for energizing the allotter start relay R430. Said last circuit extends from ground, through contacts 123 and 103', over the distributor start conductor 109, cable C159, contacts 412, the winding of R430, contacts 411 and 401, the allotter motor magnet MM1, to battery. MM1 will not energize when in series with R430; but R430 energizes and at contacts 431 opens the self-interrupting circuit of MM1, and at contacts 433 completes an obvious circuit to relay R420. R420 operates and at contacts 421 prepares an operating circuit for MM1, at contacts 422 completes a circuit to operate the peg count meter (not shown), and at contacts 423 completes a circuit to R220, the line relay of the preselected link L; said last circuit extending from ground, over contacts 423 and 452', resistor 407, allotter wiper 403, wiper contact 404, conductor 116, contacts 211 and 281, the upper winding of R220, to battery. R220 operates and at contacts 221 completes an obvious circuit to relay R230. R230 operates and at contacts 231 prepares a series circuit for the switch through relay R160 and the line cutout relay R110, at contacts 232 prepares a locking circuit for R160, at contacts 233 completes an obvious circuit for operating relay R240, and at contacts 234 prepares an operating circuit for the finder stepping magnet MM3.

If the wipers 191, 192, and 193 are standing on contacts 181, 182, and 183, said series circuit will be completed from ground through contacts 231, line 127, the upper winding of R160, the wiper 193 and contacts 183, contacts 122 and 101', and the winding of line cutoff relay R110 to battery. R110 operates rapidly; then R160 operates. R110 operating opens the circuit of R120 at contacts 111, completes an obvious circuit to operate the line lockout relay R100 at contacts 112, and completes a locking circuit for itself at contacts 113. R100 operates and at contacts 101' opens the initial operating circuit of R110, at contacts 103' opens the operating circuit of R430. R120 releases thereby to remove direct ground from conductor 108 at contacts 121, at contacts 121' connects, to said conductor, the ground in the previously described circuit to R110, at contacts 122 again opens the initial operating circuit of R110, and at contacts 123 again opens the operating circuit of R430. R160 operating completes a locking circuit for R220 at its contacts 161 and 162. This circuit extends from ground over the dial tone lead 336, through contacts 361 and 341, conductor 237, the lower winding of R220, contacts 282 and 212, conductor 168, contacts 162, wiper 192, contacts 182, conductor 105, the calling substation, and conductor 104, wiper contacts 181, wiper 191, contacts 161, conductor 167, contacts 211 and 281, the upper winding of R220 to battery; said circuit also provides a path for dial tone to the calling subscriber's receiver. At contacts 164 a locking circuit for R160 is completed from ground, through contacts 231, conductor 127, contacts 164, conductor 129, contacts 232, conductor 128, the lower winding of R160 to battery; this same ground is also extended from conductor 128 through conductor 137, contacts 267 and 165, wiper 193, wiper contact 183, contact 113, thence to R110 to hold it operated and through contacts 121' to conductor 108 thereby to maintain the calling line busy-marked; at contacts 166 ground is placed on the guard lead 117 and extended over cable C159 through allotter wiper contacts 406, wiper 405, contacts 421, the winding of MM1 to battery. MM1 energizes and at contacts 401 opens the circuit of relay 430. R430 releases to open the operating circuit of slow-release relay R420. When R420 releases it opens the operating circuit of MM1 at contacts 421 and opens the initial operating circuit to R220 at contacts 423 but relay R220 is now held operated over the calling subscriber's line. MM1 releasing steps the wipers 403 and 405 to the contacts of the next succeeding finder-connector link. If the next link is in use, the contacts accessible to wiper 405 will be grounded, as is explained during the course of the disclosure, MM1 will energize, self-interrupting contacts 401 will be opened, MM1 will de-energize thereby to step the wipers 403 and 405 to the contacts of the next succeeding link. This operation will be repeated until an idle link is seized.

It will be noted that wipers 191, 192, 193 are mechanically 180° out of phase with wipers 194, 195, 196. As wipers 191, 192, 193 step off of the last contacts accessible thereto, the wipers 194, 195, 196 step to the first contacts accessible thereto and vice versa. If, when R230 operated, wipers 191, 192 and 193 were standing on contacts other than 181. 182 and 183, and the line associated with said other contacts was idle, the contacts accessible to wiper 193 would be grounded over a circuit corresponding to ground, contacts 123', 102, and 113', and contacts 183. A similar circuit would be completed if wipers 194, 195, and 196 were standing on contacts of a non-calling line. If said line is busy, or locked out, said other contacts are also grounded as is shown during the course of the disclosure. Then, with ground placed upon said other contacts and wiper 193 standing on said other contacts, an operating circuit for MM3 is completed from ground on said other contacts, through wiper 193, contacts 165' (R160 is not as yet operated), contacts 234 (R230 is operated at this time), self-interrupting contacts 197, and the winding of MM3 to battery. This same circuit short-circuits the upper winding of R160 to prevent its operation. MM3 operates, opens its operating circuit at contacts 197, and releases, thereby to step the wipers to the next succeeding contacts accessible thereto. This operation repeats itself until wipers 191, 192 and 193 are stepped to contacts 181, 182 and 183, contacts 183 not being grounded. (If more than one call is initiated on more than one line simultaneously, the wipers 191, 192 and 193 or the wipers 194, 195 and 196 will stop when the first contact corresponding to 183 or 186 without a ground upon it is seized by its associated wiper 193 or 196; the other call will be extended after another idle finder-connector link is seized by said distributor.) The series circuit for R110 and R160 will then be completed as previously described and MM3 will not operate.

When R240 is operated in response to the operation of R230 over a circuit previously described, it prepares a pulsing circuit at contacts 243, at contacts 248 completes a circuit to start the dial tone equipment from ground, over contacts 248, conductor 319, contacts 306 and 328, over the tone start lead 339 to the dial tone equipment (not shown); at contacts 246 completes an operating circuit for relay R290 from ground, over contacts 246, conductor 288, contacts 365, 343 and 324, conductor 259, the winding of R290 to battery and an operating circuit for relay R380 from ground over contacts 246, conductor 288, contacts 376, through R380 to battery; and at contacts 247 completes an operating circuit for the timer start relay R460 from ground over contacts 247, conductor 126, contacts 474, the winding of R460 to battery. R460 operating starts at contacts 463 a timing device (not shown) common to the "kick-off" and "permanent" release circuits. The connector switch of link "L" is now ready for dialing.

*Release of link when faulty finder is encountered*

Assume the operating circuit of the finder stepping magnet MM3 is open at faulty contact 197. MM3 cannot operate as previously described to hunt for the calling line when ground is picked up by wiper 193 standing on a contact other than 183. With ground on wiper 193, the upper winding of R160 is short-circuited, and R160 will not be able to operate so as to complete at contacts 166 the previously described operating circuit of the allotter motor magnet MM1. R430 will therefore remain operated.

As noted above, R460 operating, starts a timing device. At the end of a predetermined time interval, a momentary ground will be placed by said timing device on the time #1 conductor 453. Timer relay R440 will operate over a circuit extending from ground on conductor 453, the multipled bank contacts connected to said conductor 453, contacts 442 and 432, through R440 to battery. R440 operating locks itself operated at contacts 442', and at contacts 441 prepares an operating circuit for kick-off relay R450. After a predetermined time interval, a momentary ground is placed upon time #2 conductor 454. If R440 has not released as yet in response to a release of R430 after an operation of MM1, R450 is operated over a circuit extending from the grounded conductor 454, the multipled bank contacts connected to conductor 454, contacts 441, through R450 to battery. R450 operating completes at contacts 451 an operating circuit to the allotter motor magnet MM1 from ground, over contacts 421, through MM1 to battery. At contacts 452, R450 locks itself over a circuit extending from ground, over contacts 423 and 452, through R450 to battery; at contacts 452', R450 opens the start circuit to the link start relay R220. R220 releasing completes at contacts 221' operating circuits for changeover relay R330 and minor switch magnet MM4, but this is of no consequence since link L will release and restore to normal as will be shown. It will be noted that relay R170 is operated in response to the operation of timer relay R460 which operated in response to the operation of hold relay R240. This will be described in detail later. R170 operating locks itself operated over a circuit extending from ground, over contacts 246, conductor 288, contacts 332, conductor 149, contacts 172', conductor 148, contacts 283 and 245, conductor 147, through the winding of R170 to battery. At contacts 171, R170 removes direct ground from conductor 136 and substitutes a ground over contacts 473, conductor 119, contacts 171', to conductor 136. The purpose of this substitution is of no consequence at this time. R330 operates over a circuit extending from ground, over contacts 473, conductor 119, contacts 171', conductor 136, contacts 215, 221' and 243, conductor 273, contacts 344, through the winding of R330 to battery; MM4 operates over a circuit extending from ground, over contacts 473, conductor 119, contacts 171, conductor 136, contacts 215, 221' and 243, conductor 273, contacts 344 and 353, through the winding of MM4 to battery. R330 operating opens at contacts 332 the locking circuit of R170. MM4 operating completes at off-normal contacts 333 an obvious operating circuit to R340. R340 operating prepares at contacts 347 an operating circuit for the minor switch release magnet MM5. When slow release relay R230 releases in response to the release of R220 it opens at contacts 233 the operating circuit to R240. R240 releases, opening at contacts 243 the operating circuits to R330 and MM4, opening at contacts 246 the operating circuits of R290 and R380, and completing at contacts 246' an operating circuit to MM5, said last circuit extending from ground over contacts 246', conductor 289, contacts 347, the winding of MM5 to battery. Operation of MM5 restores the minor switch to normal. Said restoration opens contacts 333 causing R340 to release. R340 releasing opens the circuit to MM5 at contacts 347 and MM5 restores. Link L is now returned to normal.

As previously described, MM1 operates in response to the operation of R450 and at contacts 401 opens the operating circuit of R340. R340 releases, opens at contacts 432 and 433 the operating circuits to R440 and R420, and at contacts 431 short-circuits its winding over a circuit extending from ground over contacts 451 and 431, its winding, contacts 412, conductor 109, contacts 103' and 123 to ground. This prevents reoperation of R430 until after R450 releases. R440 releases, but this is of no effect since R450 is held locked over a circuit previously described. R420 releases slowly and at contacts 421 opens the operating circuit to MM1; at contacts 423, opens the holding circuit to R450. MM1 releases causing the allotter wipers 403 and 405 to step to the contacts terminating the next succeeding finder-connector link. At the same time that MM1 is releasing, R450 releases and at contacts 451 removes the short-circuit from the winding of R430 and removes ground from the operating circuit of MM1 preventing its further operation (assuming as stated previously that said next succeeding link is idle and therefore its start lead corresponding to conductor 117 is not grounded). At contacts 452', the operation of R450 prepares a start circuit for the next succeeding link. It will be noted that at this instant, immediately following the seizure of said next succeeding link, removal of ground from allotter wiper 403, prior to said seizure, by means of the restoration of contacts 423 is assured since MM1 cannot release until after the release of R420. It will be further noted that, if contacts 423 fail to open when R420 releases, R450 will be held operated over its locking circuit; and the allotter motor magnet MM1 will continuously operate and release over its self-interrupting operating circuit until a repairman removes the fault. As soon as contacts 451 and 401 restore to normal, R430 can again operate over a circuit previously described and initiate the sequence of operations, previously described, whereby said next succeeding link can be prepared for routing the call. In similar equipment used in Strowger systems prior to this invention, the locking circuit of the kick-off relay corresponding to R450 was interrupted at contacts corresponding to contacts 441. Consequently the kick-off relay restored in response to the restoration of the relay corresponding to R440, and therefore prior to the release of the relay corresponding to R420. In this arrangement, MM1 frequently restored prior to the restoration of the relay corresponding to R420—the MM1 operating circuit being opened at contacts corresponding to contacts 451 with the result that the allotter wipers were stepped to the contacts terminating the next link accessible thereto; neither did R450 have contacts—*i. e.* 452'—for opening the start circuit; and, therefore, a false start circuit to said next link over the conductor corresponding to conductor 116 was completed for falsely operating the relay corresponding to R220. R230 and R240 then operated over circuits previously described. Then, if the relay corresponding to R420, released after the operation of MM1 but prior to the reoperation of the relay corresponding to R430, R220 released thereby to send a false pulse over the pulsing circuit of said next link, said circuit corresponding to the circuit extending from ground, over conductor 136, contacts 215, 221' and 245, conductor 273, contacts 344, through the winding of R330, to battery. Obviously calling subscriber could not then obtain the proper connection when he dialed.

*Release on permanents*

With respect to the "permanent" timing equipment, which we will assume to be idle, it will be recalled that R240 operated in response to the operation of R230 over a circuit previously described. At contacts 247, R240 completed an operating circuit for timer start relay R460 from ground over contacts 247, conductor 126, contacts 470, through R460 to battery. R460 operates and at contacts 461 completes an operating circuit to intermediate relay R170 from ground over contacts 461, 475' and 484', conductor 156, contacts 172, 283 and 245, conductor 147, through R170 to battery; at contacts 462 completes an operating circuit to slow to operate relay R480 from ground over wiper 407, wiper contacts 408, contacts 462, through R480 to battery; and at contacts 463 completes an obvious starting circuit to the timing device (not shown). R480 operating locks itself operated at contacts 484; at contacts 484' opens the operating circuit of R170, R170 being held operated over a circuit extending from ground over contacts 246, conductor 288, contacts 332, conductor 149, contacts 172', 283 and 245, through R170 to battery; at contacts 483' prepares an operating circuit for release relay R470; and at contacts 482' prepares an operating circuit for motor magnet MM2. R170 operating substitutes at contacts 171' ground from contacts 473 over conductor 119 in place of direct ground through contacts 171; and at contacts 172' completes its previously described locking circuit.

Now the link is prepared for dialing, and we will assume that the calling subscriber does not hang up his receiver and fails to dial. At the end of a predetermined time after the timing device is started, a momentary ground pulse will be transmitted over conductor 453 completing an operating circuit to MM2 from grounded conductor 453, the multipled bank contacts connected to conductor 453, wiper 417, contacts 482' and 402, through MM2 to battery. MM2 operates, at contacts 402 interrupts its operating circuit, and releases thereby to step the wipers 407 and 417 to contacts 428 and 429 respectively. At the end of a second predetermined time interval, a second pulse will be transmitted over conductor 454. MM2 will again be operated and released over a circuit similar to that completed for its previous operation and release. Pulses will alternately be transmitted over conductors 453 and 454—MM2 stepping the wipers—until after a predetermined time wiper 407 is stepped to contacts 426 at which time an operating circuit to R470 is completed from ground, over wiper 407, contacts 426, and 483', through R470 to battery. R470 operates and at contacts 475 locks itself operated over an obvious circuit, at contacts 475' opens the locking circuit of R480, and at contacts 474 opens the operating circuit to R460.

If the calling subscriber has not dialed the first digit during this predetermined time, the operating circuit to R230 will be opened at contacts 473 and R230 will release; at contacts 233 the operating circuit to R240 will be opened, R240 releasing; at contacts 231, ground is removed from R110 and R160, both relays releasing; R160 releasing opens at contacts 161 and 162 the operating circuit to R220, R220 releasing; R110 releasing closes the circuit to R120, R120 operates before R100 can release and at contacts 123 completes a holding circuit for R100, said circuit extending from ground, over contacts 123, 103, through R100, to battery. It will be noted that link "L" will release in a manner previously described and the line circuit associated with the calling substation is locked out. R480 releasing in response to the operation of R470 opens at contacts 483' the operating circuit to R470, but R470 is still held operated by the locking circuit previously described. R460 releasing slowly in response to the operation of R470, opens at contacts 461 the locking circuit to R470, and at contacts 463 opens the circuit to the timing device which returns to normal in a well known manner. R470 releasing completes at contacts 472 a self-interrupting operating circuit to MM2, said circuit extending from ground, over wiper 407, wiper contacts 426, contacts 472, 482 and 402, through MM2 to battery. MM2 operates, at contacts 402 opens its operating circuit, and restores to step the wipers to the next contacts accessible thereto. Again MM2 is energized over a circuit extending from ground, over wiper 407, the wiper contacts 425 and 428, contacts 483 472, 482 and 402, through MM2 to battery. MM2 again self-interrupts its operating circuit and restores to step the wipers to the next contacts accessible thereto. This stepping operation is repeated in a similar manner until wiper 407 is stepped to contacts 424, which are midway between the first and last contacts accessible to wiper 407. Contacts 424 and those following contacts are so arranged and so connected that the same sequence of operations can be repeated when D460 is again energized. The time interval between the operation of R480 and the subsequent operation of R470, is the maximum time a partially completed connection may be held without releasing the link selected for completing said connection. This time may be varied by connecting the operating circuit of R470 to a contact seized before or after contacts 426, instead of to said contacts 426.

If, before the timing equipment stepped wiper 407 to contacts 426, the calling subscriber had dialed a digit, R220 would release and at contacts 221' complete the pulsing circuit to operate R330, said circuit extending from ground, over contacts 473, conductor 119, contacts 171', conductor 136, contacts 215, 221' and 243, conductor 273, contacts 344, through R330 to battery. R330 operates and at contacts 332' opens the previously described holding circuit to R170. R170 releases and at contacts 171 reconnects direct ground to conductor 136, thus preventing release of the connector by subsequent removal of ground from conductor 119 when R470 operates.

At the end of the first digit, R330 will restore. It will now be noted that if the calling subscriber takes no further action—neither dialing a second pulse nor replacing his handset on the cradle—the same sequence of "permanent" timing operations will be repeated as soon as the first timing sequence, described above, is completed. As a result the link L will be released in a manner previously described. Similarly, if a "permanent" condition is placed on the line after any number of digits have been dialed except the last digit of a reverting call, the link "L" will be released in a manner similar to that described above.

It is to be observed at this point that the operation of relay R170 is the initial step in preparing a finder-connector link for release when said link is seized over a faulty line having a "permanent" condition thereon, or when a partially established connection is held for an unreasonable length of time. The operation of the control and switching circuits of the connector section of link L are well known in the art and are omitted except when pertinent to the operation of the "permanent" release equipment. In respect to the release of a link seized over a line on which a "permanent" condition has been placed, the link holding circuit extends from R230, through contacts 221 and 215, to conductor 136, which conductor has direct ground placed thereon over contacts 171 when R170 is deenergized, and which conductor has ground placed thereon over contacts 473, conductor 119, and contacts 171' when R170 is in an operated position. When ground is removed from said holding circuit, R230 will restore to initiate the release of said link in a manner similar to that previously described. It will be noted that ground can be removed from said holding circuit (1) at contacts 473 when R170 is in an operated position and R470 operates to open contacts 473, (2) at contacts 221 if R220 restores, or (3) at contacts 215 if R210 operates. R220 cannot restore with a "permanent" condition on the line since said condition will hold it operated over the previously described line circuit. R210 will be operated only after the establishment of a reverting call in a manner well known in the art. (R250 will operate when the calling party hangs up, R300 will operate when the called party answers, R200 will operate in response to a pulse received from the reverting call pick-up lead 305, and R210 will then be operated in series with R200 over the locking circuit of R200). It is therefore obvious that "release on permanents" can be accomplished only when R170 is in an operated position. It will be further observed that R170 can operate only during that interval of time between an operation of the timer relay R460 and the subsequent delayed operation of the slow to operate relay R480, since, as has been shown, the operation of R460 completes the operating circuit of R170 and the operation of R480 opens said circuit. When R170 operates, it is held operated over a circuit extending from ground over contacts 246, conductor 288, contacts 332, conductor 149, contacts 172', 283 and 245, through its winding to battery. This circuit can be opened (thereby to prevent release of the link after a predetermined time) at contacts 246 and 245 by a release of R240 or at contacts 332' or 283 by an operation of R330 or R280. R230 is a typical back-bridge relay operated in a manner well known in the art when a called party answers. It is intended that conversations shall not be timed. R330 is a typical changeover relay operated whenever a digit is dialed, and is restored at the end of said digit thereby to again prepare the locking circuit of R170. R240 is the link hold relay and therefore restores only when the link is released. Therefore it seems obvious that a link seized over a line, on which a "permanent" condition exists, will be released so long as no reverting call connection to that line has been established over said link, or as long as no party called over said link answers the call to thereby energize the back-bridge relay of said link.

It will be noted that R460 will be in an operated position so long as the relay of any link corresponding to R240 of link "L" is operated and R470 is not operated. Consequently, if several calls are in progress, the sequence of "permanent" timing operations will continue to repeat. During the short time interval following each operation of R460 and preceding the subsequent operation of R480, the relay corresponding to R170 in each busy link will be operated if as previously described its associated relay corresponding to R240 is operated and if its associated relay corresponding to R280 is not operated. If thereafter a "permanent" is placed on the calling line, the link seized over said calling line will be released in the manner previously described.

Assume a subscriber initiates a call, then hangs up causing the link seized over the calling line to release after wipers 407 and 417 have been stepped to contacts 428 and 429 respectively; assume also that no other links associated with the allotter are busy. R460 will release in response to the release of the hold relay of said link; the timing device will stop in response to the release of R460; R480 will release in response to the release of R460, thereby to complete a self-interrupting circuit to MM2, said circuit extending from ground over wiper 407, contacts 428, 483, 472, 482 and 402, through the winding of MM2 to battery. MM2 will operate, opens its circuit at contacts 402, and restores to step the wipers to the next contacts accessible thereto. MM2 operating over a similar circuit, including the multipled contacts connected to contacts 428 (will step the wipers to contacts 426 and 436 at which point MM2 will advance the wipers to a starting position in a manner previously described.

While there has been described what is at present considered to be the preferred embodiment of the invention, it will be understood that various modifications may be made therein, and it is contemplated to cover in the appended claims all such modifications as fall within the true spirit and scope of the invention.

What is claimed is:

1. In an allotter for starting an idle preselected finder, a hold relay, means for operating said relay, a circuit for starting said preselected finder, means whereby said circuit is completed responsive to the operation of said hold relay, a kick-off relay, timing means for operating said kick-off relay if the preselected finder fails to operate, means for opening said circuit, means whereby said last-mentioned means is operated responsive to the operation of said kick-off relay, means for restoring said hold relay, means whereby said last-mentioned means is also operated responsive to the operation of said kick-off relay, means for selecting a second finder, means whereby said last-mentioned means is operated responsive to the restoration of said hold relay, means for restoring said kick-off relay, means whereby said last-mentioned means is operated responsive to the restoration of said hold relay, means whereby said first-mentioned means is reoperated responsive to the restoration of said kick-off relay to reoperate said hold relay, a second circuit for starting the second finder, means whereby said second circuit is completed responsive to the reoperation of said hold relay.

2. In an allotter for starting an idle preselected finder, a hold relay and a kick-off relay in said allotter, a start lead, means for operating said hold relay, contacts operated by said hold relay to ground the start lead to start the preselected finder, timing means for operating said kick-off relay in case the preselected finder fails to operate, contacts operated by said kick-off relay opening said start lead, means including other contacts operated by said kick-off relay for causing said hold relay to restore, means for operating the allotter to select a second finder, means whereby said last means is operated responsive to the restoration of said hold relay, said first-mentioned contacts restored by said hold relay to cause said kick-off relay to restore, said other contacts restored by said kick-off relay to permit the said first means to reoperate said hold relay to reoperate said first-mentioned contacts, said second-mentioned contacts restored by said kick-off relay, and said reoperation of said first-mentioned contacts by said hold relay grounding the start lead to start the second finder.

3. In an allotter for preselecting an idle one of a group of finders and for starting the preselected finder, a kick-off relay in said allotter, a start circuit including normally closed contacts on said kick-off relay, means for grounding said start circuit by way of said contacts on said kick-off relay thereby to start the preselected finder, timing means for energizing said kick-off relay in case the preselected finder fails to operate within a predetermined time, a locking circuit for maintaining said kick-off relay operated independent of said timing means, means whereby said locking circuit is completed responsive to said energization, means for opening said start circuit, means whereby said last-mentioned means is operated responsive to said energization, means for causing said allotter to select a second finder and to thereafter open the locking circuit of said kick-off relay, means whereby said last-mentioned means is controlled by said kick-off relay, means whereby said first means is reoperated after the restoration of said kick-off relay to ground said start lead through said kick-off relay contacts to start said second finder.

4. In an automatic telephone system, a group of subscriber lines, a group of finders having access to said lines, means including an allotter for preselecting an idle one of said finders, a timing device associated with said allotter, an individual start lead for each of said finders, means including a start and a hold relay in said allotter for connecting ground to the start lead of the preselected finder for initiating the operation of said preselected finder, means whereby said second-mentioned means is operated responsive to the initiation of a call on one of said lines, means for operating said finder to find the calling line, means for causing said finder to switch through and extend the connection from the calling line, means whereby said last-mentioned means is responsive to the finder finding the calling line, means including a restoration of said start and hold relays for operating said allotter to select another idle finder in the group, means whereby said last-mentioned means is responsive to said switch through operation of said first finder, a kick-off relay in said allotter, means for energizing said kick-off relay in case said preselected finder fails to operate and switch through within a predetermined time, means whereby said last-mentioned means is responsive to said timing device, contacts on said kick-off relay for removing ground from said start lead, means whereby said contacts are operated in response to the energization of said kick-off relay, means whereby said seventh-mentioned means is controlled by said kick-off relay to cause said allotter to select a second idle finder, short circuiting means for said start relay for preventing the reoperation of said start relay until said kick-off relay restores, means whereby said short-circuit means is completed by the restoration of said start relay, contacts on said hold relay, means whereby said last-mentioned contacts are controlled by the restoration of said hold relay for restoring said kick-off relay, means whereby said start and hold relays are reoperated in response to the restoration of said kick-off relay, and said contacts on said kick-off and said hold relays preventing the grounding of the start lead of the second finder until said kick-off relay restores and said hold relay is reoperated.

5. In an apparatus for causing the release of a switching link in an automatic telephone system when said link becomes seized over a subscriber line upon which a false calling condition has been placed, a rotary switch including a stepping magnet, a set of wipers and multipled contacts accessible thereto, a timing device with circuits for transmitting momentary ground pulses to the multipled contacts of said switch, a start relay for starting said timing device, a link holding circuit, means for completing said link holding circuit, means whereby said first-mentioned means is operated responsive to the operation of said start relay, a slow to operate relay for preparing an operating circuit including said wipers and multipled contacts for said magnet, means whereby said slow to operate relay is operated responsive to the operation of said start relay, said magnet energizing and deenergizing over said prepared operating circuit in response to each momentary ground pulse transmitted to said switch contacts, a second group of contacts accessible to a second set of wipers in said switch, means whereby each set of wipers is stepped to the next contact accessible thereto in response to each deenergization of said magnet, a release relay, a predetermined one of said second group of contacts, means whereby said release relay is operated when said second set of wipers is stepped to said one contact, contacts on said release relay for opening said holding circuit, thereby to initiate the release of said link, means whereby said last-mentioned contacts are operated in response to the operation of said relay.

6. In an apparatus as described in claim 5, means for releasing said start and slow to operate relays, means whereby said last-mentioned means is controlled in response to the operation of said release relay, means including contacts on said release relay for completing a self-interrupting operating circuit including said predetermined contact for operating and releasing said magnet thereby to step each set of wipers to the next contact accessible thereto, means whereby said last means is operated responsive to the restoration of the start relay, said next contact accessible to said second set of wipers being the first of a plurality of multipled contacts, a second self-interrupting operating circuit for said magnet including said last-named multipled contacts and said second set of wipers, and means whereby said second self-interrupting circuit is completed each time said second set of wipers seizes one of said last-named multipled contacts, said wipers thereby being stepped to a starting position.

7. In an allotter, a means for initiating the release of any finder-connector link accessible to said allotter at the end of a predetermined time after a subscriber line, over which said link is seized, has a false calling condition placed thereon, said means comprising a rotary switch including a stepping magnet, a first and second set of wipers and a group of multipled contacts accessible to said first set of wipers, a timing device with conductors for transmitting momentary pulses to the multipled contacts of said switch, a start relay, means for operating said start relay, means for starting said timing device, means whereby said last-mentioned means is operated responsive to the operation of said relay, a slow to operate relay, means for operating said slow to operate relay, means whereby said last-mentioned means is operated responsive to the operation of said start relay, means including contacts on said slow to operate relay for energizing and deenergizing said magnet, means whereby said last-mentioned means is controlled in response to each of said pulses, means for stepping each set of wipers to the next contacts accessible thereto, means whereby said last-mentioned means is operated responsive to each deenergization of the magnet, a second group of contacts in said switch accessible to said second set of wipers, a release relay, a circuit including a predetermined one of said second group of contacts for operating said release relay, said last-named circuit completed when said second set of wipers is stepped to said predetermined contact, a link holding circuit including contacts on said release relay, a preparatory relay in said link, means for operating said preparatory relay, means whereby said last-mentioned means is controlled in response to the operation of said start relay, contacts on said preparatory relay, means whereby said last-named contacts are operated responsive to said preparatory relay to complete said link holding circuit, means whereby said contacts on said release relay are operated in response to the operation of said release relay to open said holding circuit thereby to initiate the release of said link.

8. In an allotter as described in claim 7, means for releasing said start and slow to operate relays, means whereby said last-mentioned means is responsive to the operation of said release relay, means including other contacts on said release relay for operating and releasing said magnet, means whereby said last-mentioned means is responsive to the release of said start relay, thereby to step said second set of wipers to the next contact accessible thereto immediately after said predetermined contact, said next contact being the first of a plurality of multipled contacts, means including said last-named multipled contacts and said second set of wipers for energizing and deenergizing said magnet a predetermined number of times, said last-mentioned means effective when said second set of wipers is stepped to said last-mentioned contact, said wipers thereby being stepped to a starting position.

9. For use in a telephone system, an apparatus for initiating the release of switches seized over subscriber lines upon which false calling conditions have been placed, said apparatus comprising a start relay, means for energizing said relay, a timing device for generating impulses, means for starting said timing device, means whereby said starting means is operated responsive to the energization of said relay, a release relay, means including normally closed contacts on said release relay for holding each link that is busy, means whereby said holding means is effective responsive to the energization of said start relay, means for operating said release relay, contact means for partially completing said release relay operating means, means whereby said contact means is operated responsive to the energization of said start relay, means whereby said release relay operating means is completed responsive to a predetermined one of said impulses, means whereby said contacts on said release relay are operated responsive to the operation of said release relay for opening said holding means, thereby to initiate the release of each link held over said holding means.

10. For use in a telephone system having a plurality of subscriber lines and a plurality of switches, each switch having a hold relay which is operated when the switch is seized, a supervisory circuit for initiating the release of switches seized over subscriber lines having false calling conditions established thereon, said circuit comprising a timer common to all of the switches and having a plurality of positions including a start position, means controlled by each switch for operating the timer as long as one or more of the switches are connected to subscriber lines, a holding circuit associated with the timer, means in each seized link operated by the timer in its start position for connecting the respective operated hold relays to said holding circuit, means in the timer operated in another position of the timer to open the holding circuit, thereby to restore all hold relays connected thereto, and means controlled by said restored hold relays for initiating the release of their respective links.

11. The combination claimed in claim 10, together with means controlled by said last means for causing the respective lines over which said released links were held to be locked out of service.

12. In a telephone system, a plurality of subscriber lines, a plurality of switching links, each having a hold relay and a circuit for operating the hold relay, means controlled upon the initiation of calls over some of said lines for connecting said calling lines to different ones of said links and for operating the hold relays of said different links over their respective operating circuits, a timer common to all of said links and having a plurality of positions including a start position, means controlled by each of said links for operating the timer while one or more of said links are connected to said subscriber lines, a control circuit associated with the timer, a transfer relay in each link for disconnecting the respective hold relay from its operating circuit and for connecting it to said control circuit, means in the timer for operating the transfer relays of all connected links each time the timer occupies its start position, said operated transfer relays connecting the respective operated hold relays to said control circuit, means in the timer operated in a predetermined time interval after the operation of the transfer relays to open said control circuit, thereby to restore the hold relays connected thereto, and means controlled by said restored hold relays for initiating the release of their respective links.

13. The combination claimed in claim 12, together with means in each of said links controlled upon the receipt of each digit from the respective calling lines to which the links are connected for restoring the respective operated transfer relays, thereby to reconnect the respective hold relays to their respective operating circuits, said transfer relays reoperating each time that the timer occupies its start position, means in each link controlled upon the receipt of digits corresponding to a subscriber number for connecting the calling line to the subscriber line corresponding to said number, and means in each link operated, when a call established over the link is answered, for preventing the reoperation of the respective transfer relay, whereby each link will be forcibly released only when a partially completed connection is held by the link for an unreasonable time interval.

References Cited in the file of this patent

UNITED STATES PATENTS 2,513,426 Lomax ------------------ July 4, 1950